No. 828,618. PATENTED AUG. 14, 1906.
A. J. A. G. MARICHAL.
TURBINE.
APPLICATION FILED NOV. 4, 1904.

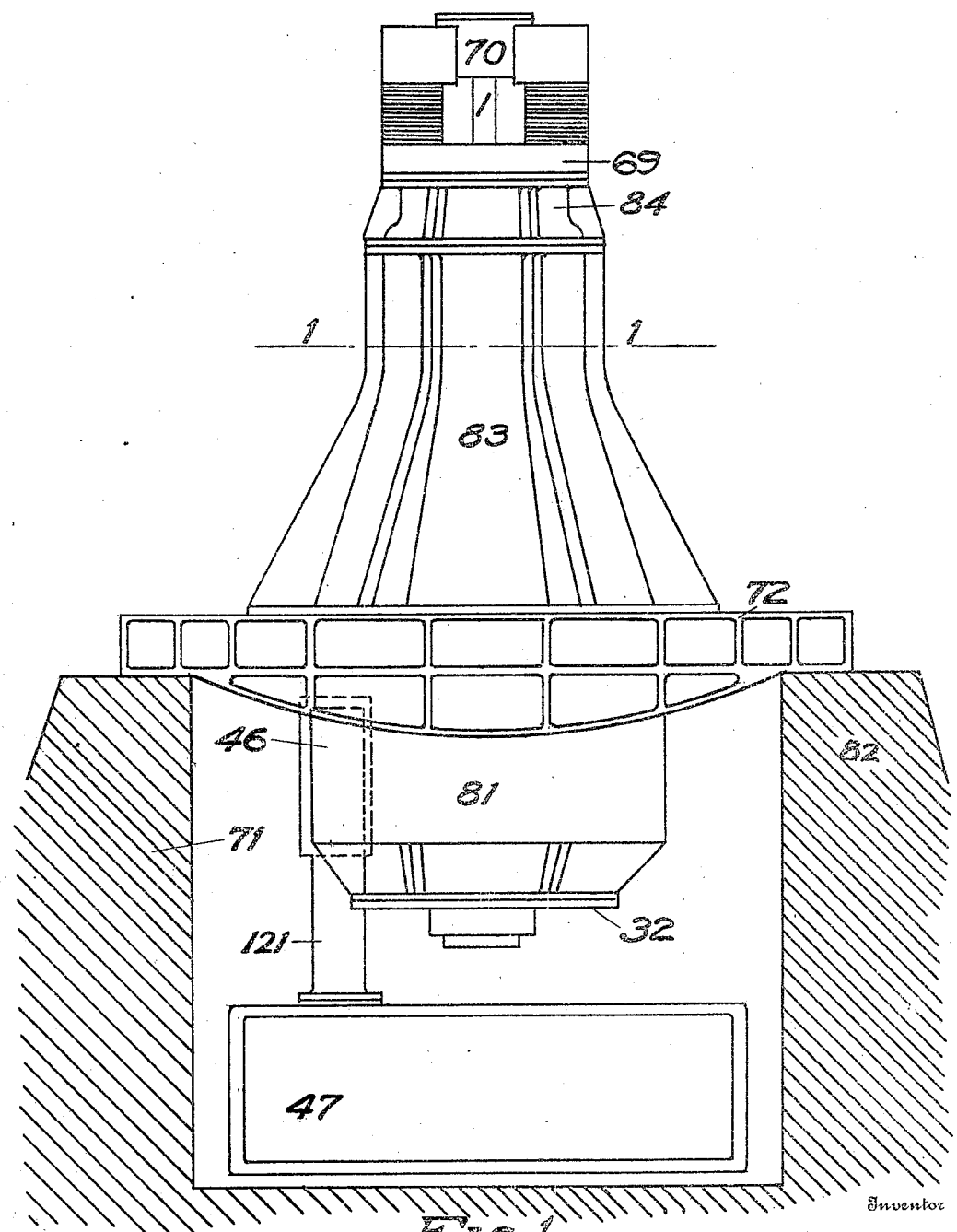

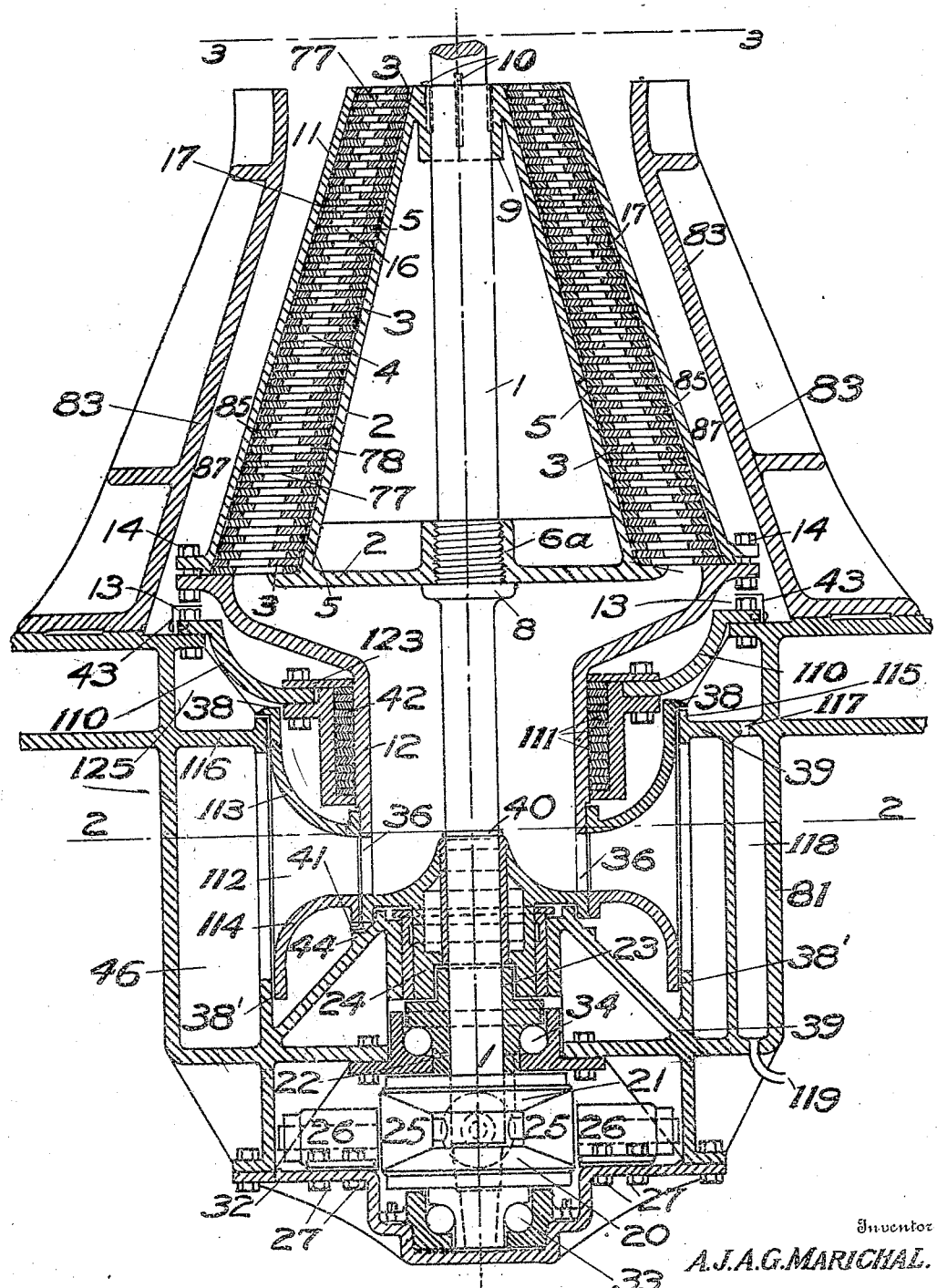

6 SHEETS—SHEET 3.

Inventor
A. J. A. G. MARICHAL.

By Edward P. Thompson
Attorney

Witnesses

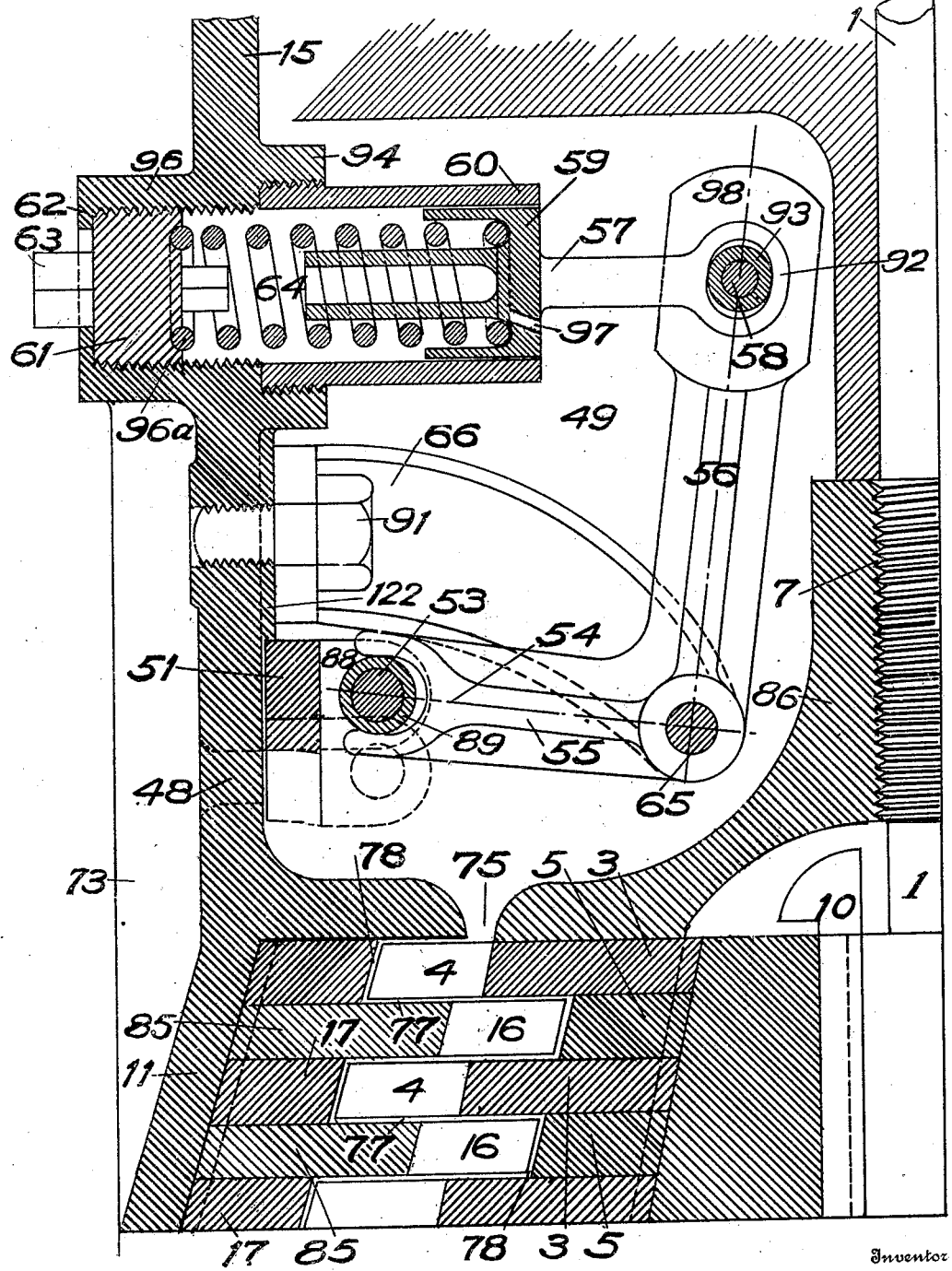

UNITED STATES PATENT OFFICE.

ARTHUR J. A. G. MARICHAL, OF "SPRINGFIELD" BOWDON, ENGLAND.

TURBINE.

No. 828,618.  Specification of Letters Patent.  Patented Aug. 14, 1906.

Application filed November 4, 1904. Serial No. 231,378.

*To all whom it may concern:*

Be it known that I, ARTHUR J. A. G. MARICHAL, a subject of the King of Belgium, and a resident of "Springfield" Bowdon, in the county of Chester, England, have invented certain new and useful Improvements in Turbines, of which the following is a specification.

My invention relates to a turbine adapted to be operated by any fluid, whether water, oil, steam, air, or other liquid or gas.

My objects to be considered jointly are, first, to obtain from a given size of turbine a greatly-increased output as compared with the turbines now found upon the market or to greatly reduce the size of the turbine now necessary for a given output; secondly, to reduce to a minimum the necessary handwork and total cost of making and assembling the blades, and, thirdly, to produce a prime mover by which I can drive a similar form of electric generator. This generator will have the same advantages as the turbine—namely, a greatly-increased output for a given size of generator or a greatly-reduced size for a given output. I would state here that as both of the elements of the turbine and generator rotate their relative velocity becomes double without increasing the diameter or the number of revolutions per minute. I can therefore obtain a desired relative velocity without going so near to the limiting conditions that result from the effect of centrifugal force. By rotating both elements of an electric generator in combination with the rotary elements of the turbine their relative speed is doubled, and I can therefore either reduce the size of the elements one-half or, keeping the size the same, increase the output to double that originally obtained. This construction becomes practical by interlocking one pair of rotating elements, consisting of one set of blades and the armature, for instance, with the other rotating element, consisting of the other set of blades and the field-magnet, and providing gearing for maintaining equal and opposite velocities thereof. I consider of especial importance this locking-gearing between the two rotating parts.

The principles of my improvement may best be understood by a specific illustration, and I have therefore set forth in the accompanying drawings one form or embodiment of my improved turbine, this particular form being intended for use as an elastic fluid or steam turbine and being of the type in which the parts rotate on a vertical axis.

Figure 4:
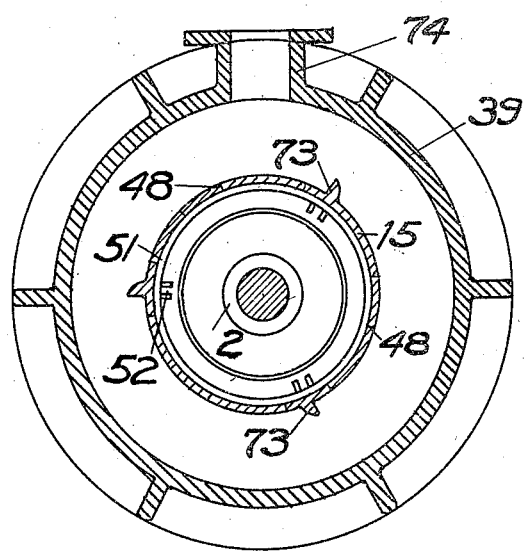
Figure 3:
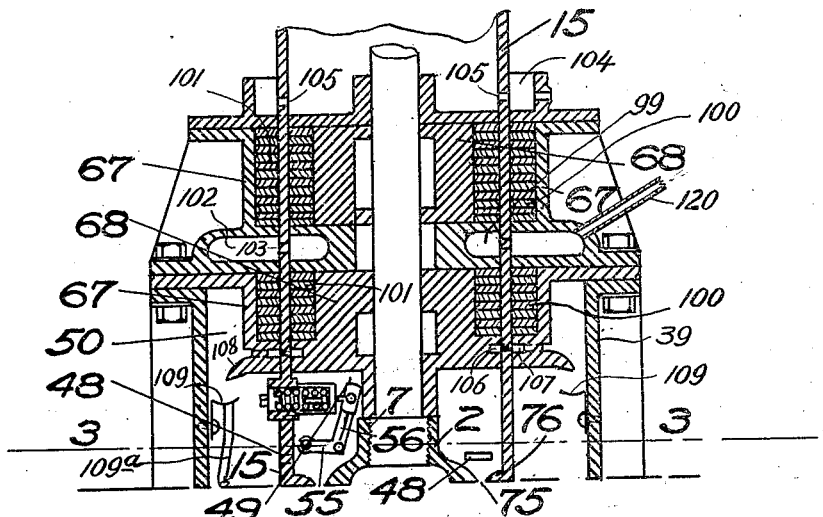
Figure 6:
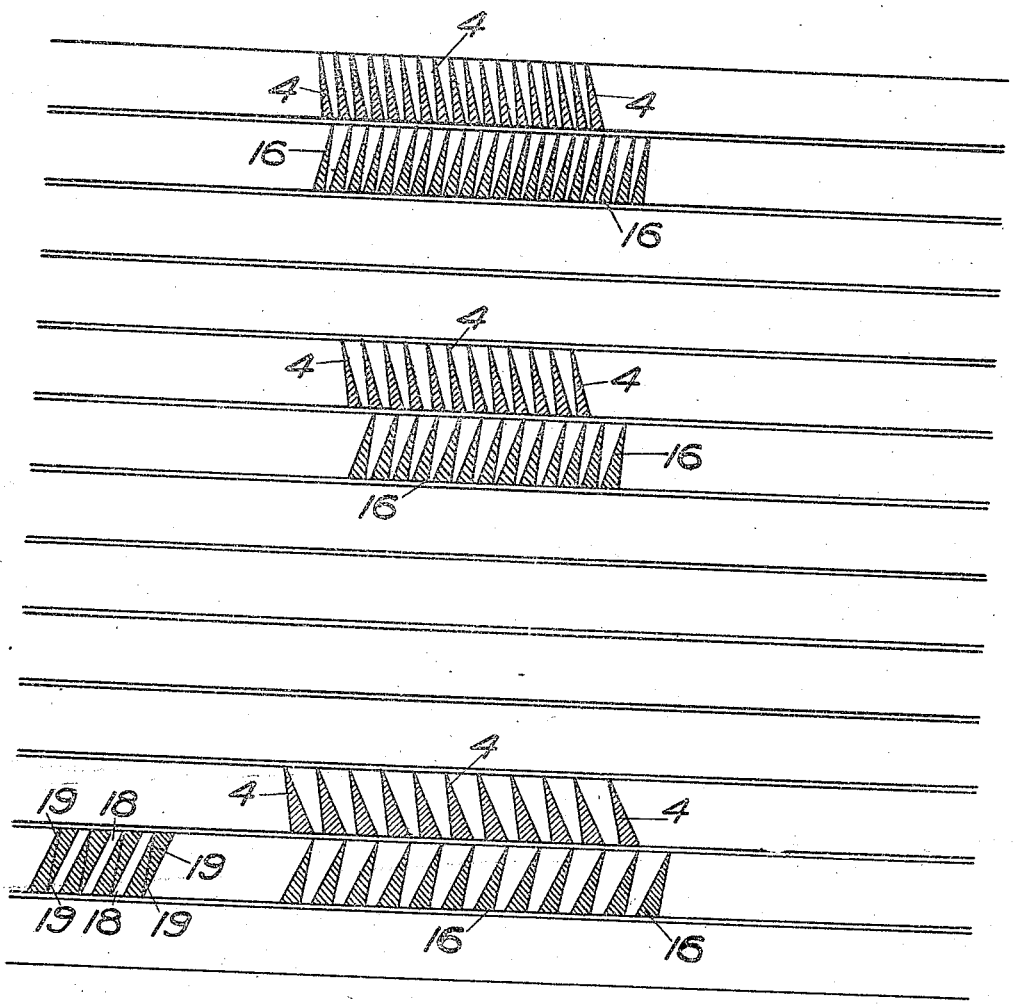
Figure 7:
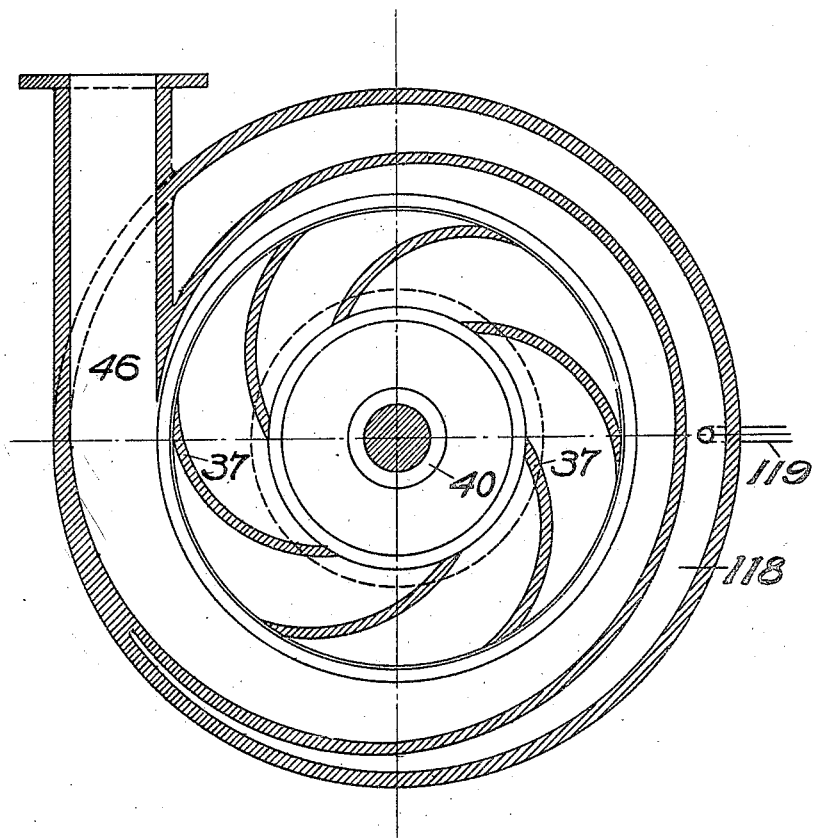

In the drawings, Figure 1 represents a side elevation of the turbine in combination with a condenser. Figs. 2 and 3 constitute jointly a vertical central section through the turbine, Fig. 3 being the upper portion thereof, which is cut off from Fig. 2 owing to the limitations of the sheet. Fig. 4 is a plan section through the upper portion of the turbine—namely, on the line 3 3. Fig. 5 is a central section through a portion of the turbine on a larger scale, showing the governing mechanism. Fig. 6 is a developed and partly-diagrammatic view of the blades, showing the construction thereof. Fig. 7 is a plan section on the line 2 2 of Fig. 2.

The rotating parts of the turbine are inclosed in a casing 39 of generally circular section divided into three main parts—to wit, the lower section 81, which has flanges 72 cast integral therewith and resting on the foundation 71, the upper portion 83, which, as shown, is ribbed to secure strength and rigidity and is bolted to the section 81, (this section will ordinarily be covered with insulating-lagging to prevent the escape of heat,) and the upper section 84, comprising a packing gland or cap, which is bolted to the upper end of the section 83 and forms a closure for the steam-space. Within this three-part casing are mounted the two rotating parts, comprising a conical drum 2, which is mounted on a vertical shaft 1, and a conical barrel 11, which is bolted to a tubular and generally cylindrical base portion 12, as shown. The shaft 1 rests upon a ball-bearing, as shown at 33, which is supported by the cap-piece 32. The barrel 11 is provided with a hub 24, surrounding and loosely rotating on the shaft 1 and forming a closure for the exhaust-steam. This hub has a squared recess into which fits a similar squared projection 23 on the rotating member of the ball-bearing 34, the stationary member of which is bolted to the casing member 81. It will be observed that the casing formation is such as to secure closed chambers surrounding the ball-bearings and the gearing to be hereinafter described, which chambers in operating are filled with oil from the reservoir-chamber 118, thus securing at all times thorough lubrication of the bearing-surfaces.

The blades of the turbine, against which the steam reacts, comprise two series of overlapping rings—to wit, a series 3 having blades 4, mounted on the drum 2, and a series 85 having blades 16, mounted on the inner side of the barrel 11, Fig. 5. The rings 3, carrying the blades 4, alternate with plain rings 5 of less diameter, and the whole is keyed against rotation by the keys 10 and secured in position by a nut 86, engaging with a screw-thread 7 on the shaft 1 above the small end of the drum 2. It may be stated that a convenient way of securing the drum 2 to the shaft is by means of a screw-threaded boss 6ª and shoulder 8, formed on the latter. The rings 85, bearing the blades 16, are in like manner supported by alternate plain rings 17, and the whole keyed against rotation and clamped firmly together by the bolts 14, which press the flanged end of the barrel 12 against the lowermost ring 85. Thus the resulting effect is substantially the same as if the blades were cut solid with the drum and barrel, respectively.

The manner of forming the blades is illustrated more particularly in Fig. 6. Starting with a plain ring without blades, a series of equidistant oblique cuts 18 are made in the external periphery of the ring 3 or the internal periphery of the ring 85, as the case may be. Another series of equidistant oblique cuts are then taken over the same periphery, but at a less obliquity than before, so as to cut the edges of the blades on the dotted lines 19, Fig. 6, the result being the formation of a series of triangular or wedge-shaped blades, leaving interspaces of tapering sections larger at the top than at the bottom. It will be observed also that the slope of the blades 4 of the drum is in the opposite direction to that of the blades 16 of the barrel, whereby the steam is made to react against them in opposite directions, and they are thereby caused to rotate in opposite directions. The form and dimension of these blades is such that their ends overlap the blank portion of the rings 3 and 85, the object being to prevent the leakage of steam around the ends of the blades and through the slight endwise clearance 78, which is necessary in the practical construction. A slight vertical clearance 77 is also allowed for between the successive rings 3 and 85 by making the spacing-rings 5 and 17 of greater thickness than the rings 3 and 85. This clearance, however, is very small, for the reason that the longitudinal movement between the parts due to unequal expansion is extremely slight in my construction of turbine, as will be hereinafter shown. It is obvious that with this construction no blade can become loose, while the possibility of breakage is extremely small, because the total torque of the turbine is distributed over so great a number of blades that the resultant pressure on each is very slight and far within the limit of safety and, moreover, the form of the blades is such as to offer great resistance both to sidewise and downward pressure or deformation. It will be understood, of course, that the drum 2 and barrel 11 are made conical and the blades increased in length and area from top to bottom in order to allow for the expansion of the steam which takes place as its energy is absorbed by the rotating parts, and that in a turbine to be operated by water-power these parts would be parallel or cylindrical instead of conical.

Referring now to Figs. 3 and 4, the steam arrives by the entering-passage 74 in the steam chest or space 50, which surrounds the barrel 11, the upper end of which is prolonged in a cylindrical extension 15, passing above the end of the cap 84 and forming the means of attachment to a pulley, electric generator, or other driven part. In Fig. 1 a generator-field 69 is represented as attached to the extension 15 and interacting with its armature 70 on the end of the shaft 1 to generate electric power. The steam chest or space 50 is prolonged downward into an annular conical space 87, surrounding the drum 11 and forming a steam jacket or reheater. From the steam-space 50 the steam passes through ports 48, located near the bottom of the cylindrical extension 15 and thence passes immediately through the orifice 75, Figs. 3 and 5, into the active part of the turbine, as just described. The parts of the extension 15 between the ports 48 are provided with longitudinal strengthening-ribs 73, (see Fig. 4,) which are chamfered on their forward side to diminish resistance to rotation. The space 49, inclosed between the walls of the extension 15 and the packing-glands at the upper end of the turbine, forms the governor-chamber and is illustrated on a large scale in Fig. 5. Covering or partially covering the ports 48 on the inner side of the barrel extension 15 is a ring-valve 51, which may be given a vertical sliding movement. The position of this ring-valve and consequently the amount of steam or other fluid admitted to the turbine are determined by the governing mechanism shown, which consists of the following parts. On the inside of the ring-valve is a pair of lugs 88, that carry a pin 53, on which a loose collar 89 is placed to reduce to a minimum the friction at this point. This collar is engaged by the forked end of the bell-crank lever 55 56, which in turn is supported by the fulcrum-pin 65, carried by the bracket 66. The other arm 56 of the bell-crank lever is enlarged at its end to form the governor-weight 98. It is also fitted with a pin 58, surrounded by a loose collar 93. This collar is engaged by the end 92 of a connection 57, which is carried by the guide-piston 59 and is acted on by the spring 64. The guide-piston is in turn carried and guided by the cylinder 60; but it is not meant to have a steam-tight fit in the cylinder, as its only purpose is that of a guide, and it is necessary to have the fluid-pressure equal on its two sides. To secure this, I have placed a vent-hole 97, extending from one face to the other. The spring 64 acts in one direction against the piston 59 and in the other direction against the adjustable plug 61. This plug can be screwed in or out to vary the compression of the spring, but being entered from the inside it cannot work out because of the shoulder 62. Three or more such governors are provided in order to securely support the ring-valve 51.

With the above explanation the action of the governor will be understood to be as follows: The compression of the spring 64 being adjusted for a certain speed of rotation at any higher speed the centrifugal force acting upon the arm 56 of the lever 55, its weighted end 98, and the piston 59 overbalances the force of the spring 64 and causes the lever 55 to fall in such a manner that the valve 51 is pushed downward until it partially or completely covers the port 48, the particular point at which the valve 51 remains stationary depending on the amount of steam necessary to maintain the equilibrium of the spring 64 and the centrifugal force above mentioned, which can only take place at the fixed speed to which the governor is set. The steam-chest 50 and governor-chamber 49 containing live steam are closed by packing-boxes, as shown in Fig. 3. On the shaft 1 are mounted two such boxes 68, separated by an annular space 99, and these packing-boxes are provided with a plurality of packing-rings 100, which prevent the passage of steam between the chamber 49 and the atmosphere. Similarly the joint between the cylindrical extension 15 and the casing 39 is sealed by two packing-boxes 67, which form a part of the cap-piece 84 and likewise contain a plurality of packing-rings 101, and between these two packing-boxes 67 is an annular space 102, which is opposite the annular space 99 and communicates therewith by perforations 103 in the wall of the cylinder 15. These annular spaces 99 and 102 are oil-spaces, into which the oil is forced by a pump through the pipe 120, whence finding its way between the packing-rings 100 and 101 it issues on the one hand into a catch-basin 104, connected by passage-ways 105 with the space within the extension 15, and on the other hand into annular spaces 106 and 107, formed in the lower packing-boxes 67 and 68 below the packing-rings thereof, from which the oil flows through radial passage-ways over the shield 108, is thrown against the inner sides of the extension 39, and is collected by an annular trough 109 and conducted into the reheating-space 87 by a short pipe 109ᵃ and flows down to a packing-box 42, situated near the lower end of the revolving barrel. The packing-box 42 is secured by bolts, as shown, to an annular member 110 and is formed in the same manner as the boxes 67 and 68 of rings 111, held in place by a plate 123. At the lower end of the barrel 12 are formed exhaust-openings 36, over which is secured the casing 112, composed of two basin-shaped flanges 113 and 114, connected together by spiral webs 37, as shown in the section, Fig. 7. This casing 112 is secured to the barrel 12 by keys 41, driven in from below and held against falling out by a circular shoulder 44 on the casing. The upper surface of the basin-shaped flange 113 forms a receiving-basin for the oil which is forced through the packing-box 42, and the oil which collects in this basin is thrown by centrifugal force over the rim 38 thereof into the annular receiving-chamber 125, which is formed on the interior of the casing and has a circular flange 115 under the rim 38 of the basin, so as to form an annular trough around the bottom of which may run a circular groove 116, which conducts the oil to an orifice 117, leading into an oil-reservoir 118, the horizontal section of which is seen in Fig. 7. From this oil-reservoir the oil is pumped through a pipe 119 back to a higher level or directly into the annular space 102, as already described. The exhaust-steam issuing from the vanes of the turbine at the point 35 passes into the barrel 12 and thence, as above indicated, passes downward through the exhaust-apertures 36 and out through the casing 12. This movement is accelerated by the spiral webs or vanes 112, which diminish the resistance of passage to the exhaust and cause it to be ejected into the pipe 46, from whence it passes either to the atmosphere or through a pipe 121 to the condenser 47.

From the description above given the mode of operation will be clear without further explanation—namely, that the drum 2 and barrel 11 are each caused to rotate and in opposite directions. Now the power output of a machine of this sort is directly proportional to its speed, and the mechanical limits of the speed therefore place a limit upon the practical output that can be obtained. When, however, we can rotate the two parts each at the maximum speed, it is clear that the relative speed of the parts is double that where one part only rotates at the same speed, and therefore that, other things being equal, the output of the apparatus as a whole will be doubled, or, conversely, for a given output the actual speed of rotation of each part would be only one-half of that where the shaft alone rotates. This reduction of speed offers conspicuous advantages in steam-turbines, the nature of which, as is well known, requires a very high relative speed between the parts for the maximum efficiency. Now in order to regulate the actual speed and to cause the two parts to move at equal velocities I have introduced gearing comprising bevel-gears 20 and 21, secured to the shaft 1 and hub 24, (or, rather, to the rotary bearing-block of the bearing 34,) respectively, which gears face each other and both mesh with a plurality of radially-set pinions 25, mounted in stationary bearings 26, secured upon the cap-piece 32 by bolts 27, the effect of which connection is to cause the actual speed of each member to be the same. In some cases, however, it will be desirable to fasten or secure one member against rotation while the other alone rotates, and with this mode of operation my turbine is particularly adapted to marine use and other purposes requiring a reversing-engine.

When applied to the direct connection to a generator, the mounting will be substantially as shown in Fig. 1, the field 69 being mounted on the cylinder 15 and the armature 70 on the shaft 1, or vice versa; but when the turbine is used for mechanical transmission the driven shaft may be connected with it by means of crossed and open belts operated by pulleys secured, respectively, to the drum and barrel or by bevel-gearing similar to the arrangement 20, 21, and 25, above described, in which case one of the pinions 25 would be mounted on the driven shaft.

Although my invention is applicable to either the vertical or horizontal type of turbine, yet the vertical form, as shown, has some special advantages by reason of the ease with which the pressure on the bearings may be balanced. Taking the pressure on the shaft-bearings, it will be observed that the pressure of the steam acts downwardly upon the conical surface of the drum 2, covered by the blades, and conversely upwardly upon the lower surface of the packing-box 68. Now these two pressures may be balanced, or as nearly so as is found desirable, by properly proportioning the area of the packing-box 68 to the projected area of the drum, thus relieving the pressure upon the bearings 33, and in like manner the pressure of the steam acting upwardly against the inner surface of the barrel 11 counteracts a certain portion of the weight resting on the bearing 34.

The rings 100, 101, and 111 are spring-rings, formed and turned, as usual, for piston-packing, except that alternate rings are made with an interior and exterior grip—that is to say, one ring is made to spring outward against the interior surface of one part and the next adjacent ring inward against the exterior surface of the other. In determining the necessary amount of spring the steam-pressure is of course taken into consideration, and a close fit is made alternately against one surface and the other in such manner so as to prevent oil or steam from making a direct passage along either surface of the box and compelling it to pass in a zigzag course between the successive rings. The oil in the manner above described finds its way between the rings, and therefore the friction will be less between the rings than between them and the adjacent surfaces, and thus half of them will turn with one of the parts and the other half will remain stationary or turn with the other part, as the case may be. It will also be observed that as the rings are not fastened in place they permit of longitudinal movement between the two parts due to any contraction or expansion; but, as hereinabove pointed out, this will be very slight in my turbine, and below the section 83 of the casing will be practically negligible, because the two revolving parts are substantially at the same temperature, while in the upper part of the casing there is only a slight difference, caused by the action of the reheater-chamber 87 upon the barrel 11.

In order to prevent any possible contact between the bolts 13, which secure the casting 110 to the casing, and the bolts 14, which secure the barrels 11 and 12 together and revolve in close relation to them, I may provide an annular guard 43, consisting of an angularly-bent metal sheet, which is secured to the edge of the casting 110, as shown.

While I have described hereinabove the preferred mode of carrying out my invention, yet it is to be of course understood that in the essential features therein a wide latitude of construction is possible, while still preserving the principles thereof, and I wish it understood, therefore, that I do not limit myself to particularities and details nor to structures showing all of the features claimed, as some of these are non-essential.

I claim as my invention—

1. In a turbine, the combination of a rotary shaft, a conical drum fixed centrally thereon, and having circular external rows of blades thereon, a rotary barrel having circular internal rows of blades respectively between the first-named rows, the radial length increasing from the smaller to the larger end of said drum, means for fixing the relative speeds of said drum and said barrel, and a constant-speed governor driven by one of the rotary elements named.

2. A turbine comprising a shaft carrying a drum, a barrel rotating coaxially therewith, guide-surfaces formed on the external surface of said drum, interacting guide-surfaces formed on the internal surface of said barrel, means for conveying an impelling fluid between said guide-surfaces, whereby the drum and barrel are caused to rotate in relatively opposite directions, means for interlocking the rotating drum and barrel whereby they are maintained at all times at equal absolute velocity, said barrel consisting of two portions bolted together, each portion being partly conical and partly cylindrical, and a regulating device located entirely within said barrel for maintaining the speed constant under variation of load.

3. In a turbine, the combination of a stationary casing, oppositely-revolving turbine elements therein, and surrounded by a fluid-space between the inner surface of said casing and the outer surface of one of said elements, packing-boxes at opposite ends of said steam-space, and means for accelerating the movement of the exhaust fluid.

4. In a turbine, the combination of a casing, having a cover on its lower end, a ball-bearing on the inside of said cover, a shaft with blades resting on said bearing, another ball-bearing, a barrel with blades resting on the second ball-bearing, and gearing for engaging said shaft and said barrel 5. A turbine comprising a vertical shaft mounted to rotate on a ball-bearing at its lower end, a barrel mounted to rotate coaxially with and surrounding said shaft on another ball-bearing at the lower end thereof, and interacting driving-surfaces carried respectively by said shaft and barrel.

6. In a turbine, the combination of a vertical shaft, a ball-bearing supporting the end of said shaft, a closed oil-chamber in which said bearing is located, a rotating barrel surrounding said shaft, a ball-bearing carrying said barrel and located above the first ball-bearing, and an oil-chamber surrounding said last-named ball-bearing, whereby both ball-bearings are continuously submerged in oil during operation.

7. In a turbine, the combination of a vertical shaft, a barrel rotating coaxially with and surrounding said shaft, a casing inclosing the shaft and barrel, a ball-bearing at the lower end of said casing and contained in an oil-chamber in the lower part thereof, the shaft resting on said bearing, a second ball-bearing provided for supporting said barrel, the latter bearing being above the first and also located in an oil-chamber of the casing, a pair of bevel-gears carried respectively by the shaft and barrel and located in the space between the two ball-bearings, and a plurality of bevel-gears in said oil-chamber intermeshing with each of said first-named gears and rotating in stationary bearings, whereby the absolute speeds of rotation of the shaft and barrel are at all times identical and in opposite directions, and the whole is caused to work continuously submerged in oil.

8. In a turbine, the combination of a rotating barrel having an exhaust-steam chamber, and an annular passage-way rotating with the barrel and leading from the exhaust-steam chamber and provided with spiral vanes or webs to accelerate the movement of the exhaust-steam.

9. In a turbine, the combination of a rotating element, comprising a shaft, a conical drum on the shaft and carrying a plurality of blades, a second rotating element comprising a conical barrel having a plurality of blades on its inner surface, and interacting with the first-named blades, interlocking gearing between the two rotating elements, and sets of packing for the rotating elements, each comprising a plurality of spring-rings mounted side by side and acting by resilient pressure alternately against the internal surface of one element and the external surface of the other element, to prevent the fluid from passing in a straight course along either of said surfaces, and to cause the fluid to take a zigzag course between the successive spring-rings.

10. A turbine comprising a vertical shaft, having a drum mounted thereon, said drum carrying blades, a barrel surrounding said shaft and rotating coaxially therewith and carrying blades on its internal surface interacting with the first-named blades, a casing surrounding said barrel and having a chamber for live steam between it and the active portion of said barrel, a cylindrical projection extending from the upper end of said barrel, and forming means for attaching a driven element, packing-boxes between said shaft and said extension on the interior, and between said casing and said extension on the exterior of the latter, said packing-boxes having annular oil-chambers formed in the central portion thereof, means for forcing oil into said annular chambers, whereby said oil is forced longitudinally through said packing boxes, a receiving-basin at the upper end of said packing-boxes to receive the oil escaping upwardly, annular ducts at the lower ends of said packing-boxes connected with radial passage-ways whereby the oil escaping downwardly through the lower portions of said packing-boxes is thrown radially against the casing, and means for collecting the oil thus thrown against the casing into an oil-reservoir.

11. In a turbine comprising a vertical shaft having a drum mounted thereon, said drum carrying blades, a barrel surrounding said shaft and rotating coaxially therewith and carrying blades on its internal surface interacting with said first-named blades, a casing surrounding said barrel and having a chamber for live steam between it, and the active portion of said barrel forming a reheater, a cylindrical extension projecting from the upper end of said barrel and forming means for attaching a driven element, packing-boxes between said shaft and said extension on the interior and between said casing and said extension on the exterior of the latter, said packing-boxes having annular oil-chambers formed in the central portion thereof, means for forcing oil into said annular chambers, whereby the oil is forced longitudinally through said packing-boxes, means at the lower end of said packing-boxes to receive the oil escaping downwardly through said boxes and throw it outwardly against the casing, means for causing the oil so thrown against the casing to pass downwardly through said reheater-chamber to the lower end of said barrel, a packing-box between the casing and the lower end of said barrel through which the oil is forced, an annular receiving-basin carried by and rotating with said barrel below said last-named packing-box and arranged to throw the oil outwardly against the casing, a receiving-chamber in the casing for the oil so thrown outwardly, and a reservoir formed in the casing and connected with said receiving-chamber.

12. In a turbine, the combination of two interacting rotating elements, a casing inclosing said rotating elements, transversely-supporting brackets on the outside and near the middle of said casing, and ball-bearings supported by a dependent portion of said casing and in turn supporting the two interacting rotating elements.

13. In a turbine, a rotating barrel having blades on the inner surface thereof and one or more ports for the introduction of the impelling fluid into the interior of said barrel, a chamber adapted to receive the impelling fluid surrounding said barrel opposite to said ports, a valve comprising a sliding member on the inner side of said barrel adapted to cover said ports, a bell-crank lever pivoted at a point opposite said ports, one arm of said lever extending vertically, and a spring acting upon said vertical arm, whereby at a predetermined speed the centrifugal force acting upon said vertical arm overcomes the pressure of said spring and causes the lever to oscillate and move said sliding member to close the ports.

14. In a turbine, a rotating barrel having blades on the inner surface thereof and ports for the introduction of the impelling fluid into the interior of said barrel, a chamber adapted to receive the impelling fluid surrounding said barrel opposite to said ports, a valve comprising a sliding member on the inner side of said barrel adapted to cover said ports, a bell-crank lever pivoted at a level with the ports, one arm of said lever extending vertically, and a spring acting inwardly upon said vertical arm, whereby at a predetermined speed the centrifugal force acting outwardly upon said vertical arm overcomes the pressure of said spring and causes the lever to oscillate and to move said sliding member to close the ports, in combination with an adjustable abutment for the stationary end of said spring.

15. In a turbine, in combination with a rotating barrel carrying blades, a governor-chamber within said barrel in front of the point of entry of the impelling fluid to said blades, ports in said barrel at the level of said chamber, means for introducing the impelling fluid through said ports, a sliding member adapted to cover one or more of said ports, one or more bell-crank levers pivoted at a point within said barrel and each having an arm connecting it with said sliding member and a vertical arm, a cylinder formed in or on the wall of said barrel, a compression-spring mounted in said cylinder, a piston sliding in said cylinder, and abutting against the free end of said spring, and a connection between said piston and the vertical arm of said lever, whereby the latter is pushed inwardly and the sliding member raised.

16. In a turbine, in combination with a rotating barrel carrying blades, a governor-chamber within said barrel in front of the point of entry of the impelling fluid to said blades, ports in said barrel at the level of said chamber, means for introducing the impelling fluid through said ports, a sliding member adapted to cover one or more of said ports, one or more bell-crank levers pivoted at a point within said barrel and each having an arm connecting it with said sliding member and a vertical arm, a cylinder formed in or on the wall of said barrel, a compression-spring mounted in said cylinder, a piston sliding in said cylinder and abutting against the free end of said spring, a connection between said piston and the vertical arm of said lever, whereby the latter is pushed inwardly and the sliding member raised, and an adjustable threaded plug forming an abutment for said spring and engaging with threads on the inner surface of said cylinder and provided with means for preventing it from being completely screwed out of said cylinder on the outer end thereof.

17. In a turbine, the combination of circular rows of blades, disks from which the respective rows project in opposite directions, so that the blades in one row partly lie between the disks on opposite sides thereof, so as to leave successively larger and larger circular passage-ways from any row to a succeeding row, said passage-ways being at those ends of the blades that are attached to said disks.

18. In a turbine, the combination of a cylindrical rotary steam-chest, having steam-space in and outside thereof, and strengthening-ribs thereon curved away from the direction of rotation.

19. In a turbine, the combination of an outer casing, a barrel rotary therein, blades thereon, a rotary shaft in said barrel, blades carried thereby, valves for admitting steam from said casing into said barrel, and located on the inner side of said barrel, and means for controlling said valves.

20. In a turbine, the combination of an outer casing, a barrel rotary therein, blades thereon, a rotary shaft in said barrel, blades carried thereby, valves for admitting steam from said casing into said barrel, and located on the inner side of said barrel, means for controlling said valves, and ports formed between one portion of said barrel where there are no blades, and those portions containing the blades.

21. In a turbine, the combination of an outer casing, a barrel rotary therein, a flange within and on said barrel, blades on said barrel, a rotary shaft in said barrel, a ring around said shaft, blades carried by said shaft, valves for admitting steam from said casing into said barrel, and located on the inner side of said barrel, means for controlling said valves, ports formed between one portion of said barrel where there are no blades, and those portions containing the blades, said ports lying between said flange and said ring.

22. In a turbine, the combination of a rotary shaft, a conical drum surrounding and fixed to said shaft, annular disks surrounding and fixed to said drum, with their outer peripheries terminating in a conical surface, blades radiating from and fixed to said disks, spacing annular disks surrounding said drum and located between the respective first-named annular disks, each one of said blades consisting of a wedge, both of whose wedge-shaped surfaces are inclined toward a plane coinciding with the axis of said shaft, and passing through the apex of said wedge, and a barrel having blades opposite the first-named blades.

23. In a turbine, the combination of a rotary shaft, a conical drum surrounding and fixed to said shaft, annular disks surrounding and fixed to said drum, with their outer peripheries terminating in a conical surface, blades radiating from and fixed to said disks, spacing annular disks surrounding said spindle and located between the respective first-named annular disks, each one of said blades consisting of a wedge, both of whose wedge-shaped surfaces are inclined toward a plane coinciding with the axis of said shaft, and passing through the apex of said wedge, said blades being in circular rows around the outer peripheries of said first-named disks, and the wedges forming said blades being more inclined toward planes on some disks than on others, and a second set of blades opposite the first-named blades.

24. In a turbine, the combination of a rotary shaft, a conical drum surrounding and fixed to said shaft, annular disks surrounding and fixed to said drum, with their outer peripheries terminating in a conical surface, blades radiating from and fixed to said disks, and spacing annular disks surrounding said spindle and located between the respective first-named annular disks, each one of said blades consisting of a wedge, both of whose wedge-shaped surfaces are inclined toward a plane coinciding with the axis of said shaft, and passing through the apex of said wedge, said blades being in circular rows around the outer peripheries of said first-named disks, and the wedges forming said blades being more inclined toward said planes on some disks than on others, and also farther apart from each other on some disks than on others, and other blades opposite the first-named blades.

25. In a turbine having exhaust-ports, a fan at said ports, a shaft for said turbine, a hub loose on said shaft and carrying said fan, and blades carried respectively by said shaft and said hub.

26. In a turbine, the combination of oppositely-rotating sets of blades, an exhaust-chamber with ports, and a fan at said ports carried by one of said sets.

27. In a turbine, the combination of oppositely-rotating sets of blades, an exhaust-chamber with ports, a fan at said ports carried by one of said sets, said fan being keyed to said chamber and rotary therewith, a steam-chest surrounding one set of blades, and formed by the outer casing of the turbine, and a packing-box surrounding said chamber and located between said steam-chest and said fan, which is between said chamber and said outer casing.

28. In a turbine, the combination of oppositely-rotating sets of blades, an exhaust-chamber with ports, a fan at said ports carried by one of said sets, said fan being keyed to said chamber and rotary therewith, a steam-chest surrounding one set of blades, and formed by the outer casing of the turbine, and a packing-box surrounding said chamber and located between said steam-chest and fan, which is between said chamber and said outer casing, the outer portion of said fan bearing loosely against the said frame.

29. In a turbine, the combination of a rotary shaft, a hollow drum fixed thereon centrally and having rows of blades from one end to the other in circles, a rotary barrel having internal circular rows of blades respectively, between the first-named rows, bearing for said shaft, and bearings for said barrel surrounding said shaft, said blades being wedges which are respectively inclined to planes coinciding with the axis of said shaft, and intersecting said planes respectively, the wedges on the drum being inclined oppositely to those on the barrel in successive rows, and the sharp edges of the wedges on the barrel being contiguous to the bases of the wedges on the drum.

30. In a turbine, the combination of a rotary shaft, a conical drum fixed centrally thereon, and having circular external rows of blades thereon, a rotary barrel having internal circular rows of blades respectively between the first-named rows, the radial lengths increasing from the smaller to the larger end of said drum, blades of the drum being oppositely inclined to the blades of the barrel, and all of the blades being wedge-shaped, said wedges being more inclined at and near the larger end of the drum than at the smaller end.

31. In a turbine, the combination of a rotary shaft, blades carried indirectly thereby, an oppositely rotary barrel, blades thereon respectively between the other blades, a cylindrical chamber forming an extension of said barrel and having exhaust-ports, a boss surrounding said shaft and carrying said barrel and chamber, and a loose bearing surrounding said shaft and supporting and coupled to said boss.

32. A turbine comprising concentric rotating elements carrying interacting surfaces adapted to receive the driving fluid and to drive said elements in opposite directions, mechanism locking said elements together for allowing equal and opposite rotations by the action of said fluid; the outer element carrying fluid-admission valves, a centrifugal governor, and connections between said valves and governor; and an annular stationary steam-chest completely surrounding the outer element, and having ports leading to said valves that are regulated in size by said valves.

33. A turbine comprising concentric rotating elements carrying interacting surfaces adapted to receive the driving fluid, and to drive said elements in opposite directions, mechanism locking said elements together for allowing equal and opposite rotations by the action of said fluid, a chamber formed in one of said elements, a fixed steam-chest surrounding the chamber, and having ports leading to said chamber, packing between said chamber and said chest, valves for said ports, a bell-crank lever pivoted in said chamber for swinging on the pivot by centrifugal force during rotation of the elements, and connecting with said valves, and a spring for partly resisting the action of the centrifugal force upon said lever.

34. A turbine comprising concentric rotating elements carrying interacting surfaces, adapted to receive the driving fluid and to drive said elements in opposite directions, mechanism for locking said elements together for allowing equal and opposite rotations of said elements by the action of said fluid, a cylindrical chamber formed in one of the elements, an annular stationary steam-chest surrounding said chamber, ports communicating from said chest to said chamber, valves for said ports, and a plurality of centrifugal governors in said chamber connecting with said valves and governing the same for maintaining a constant speed under variation of load on said turbine.

35. A turbine comprising two rotating elements carrying interacting surfaces adapted to receive the driving fluid and to drive said elements in opposite directions, means for interlocking said elements for allowing equal and opposite rotations by the action of said fluid, a cylindrical chamber formed in one of the elements, a stationary annular steam-chest surrounding said chamber, ports communicating from said chest to said chamber, a ring-valve for the ports, capable of a sliding movement for regulating the effective sizes of the ports, centrifugal governors pivoted in said chamber and connecting with said ring, a guiding-piston connecting with said governor, a spring partly resisting the movement of said piston, and a port leading from said chamber to said interacting surfaces.

In testimony whereof I have hereunto set my hand and affixed my seal, this 20th day of October, 1904, in the presence of two subscribing witnesses.

ARTHUR J. A. G. MARICHAL. [L.S.]

Witnesses:
  Ew. BODTON,
  E. POPP.